United States Patent [19]
Sekhar et al.

[11] Patent Number: 5,770,632
[45] Date of Patent: Jun. 23, 1998

[54] RECLAIMING OF ELASTOMERIC MATERIALS

[76] Inventors: Balachandra Chakkinggal Sekhar, 62A, Jalan Medang Tanduk Bukit Bandaraya, Kuala Lumpur, Malaysia, 59100; Vitaly Abramovich Kormer, Zheleznovodskaya ul., 62 Apt. 500, St. Petersburg, Russian Federation, 199057; Evelina Nikolayevna Sotnikova, Ul. Vavilovykh, 4, Bldg. 1 Apt. 500, St. Petersburg, Russian Federation, 194257; Vladimir Petrovich Mironyuk, Borovaya ul., 35/37, Apt. 45, St. Petersburg, Russian Federation, 191119; Liudmila Nikolayevna Trunova, Nova-Izmaylovskii pr., 9 Apt 73, St. Petersburg, Russian Federation, 196128; Natalya Alexeevna Nikitina, Komendantskii pr., 30, Bldg. 2 Apt. 60, St. Petersburg, Russian Federation, 197372

[21] Appl. No.: 552,405

[22] Filed: Nov. 3, 1995

Related U.S. Application Data

[63] Continuation-in-part of Ser. No. 326,411, Oct. 20, 1994, abandoned.

[30] Foreign Application Priority Data

Jun. 25, 1994 [MY] Malaysia ............................ PI9401654
Mar. 3, 1995 [EP] European Pat. Off. .............. 95301399

[51] Int. Cl.⁶ ...................................................... C08J 11/04
[52] U.S. Cl. ............................. 521/41.5; 521/42; 521/43; 525/343
[58] Field of Search ........................... 264/115, DIG. 69; 521/43, 42, 41.5; 525/343, 353

[56] References Cited

U.S. PATENT DOCUMENTS

| | | |
|---|---|---|
| 2,088,920 | 8/1937 | Pickett . |
| 2,415,449 | 2/1947 | Sverdrup .................................. 521/43 |
| 4,101,463 | 7/1978 | Morgan et al. ........................... 521/43 |
| 4,110,240 | 8/1978 | Leo et al. ................................. 525/343 |
| 4,211,676 | 7/1980 | Watabe et al. . |
| 4,340,695 | 7/1982 | Schubart et al. ........................ 525/343 |

FOREIGN PATENT DOCUMENTS

| | | |
|---|---|---|
| 110439 | 10/1963 | Czechoslovakia . |
| A 885 895 | 9/1943 | France . |
| A 956 297 | 9/1982 | U.S.S.R. . |
| A 1 620 454 | 1/1991 | U.S.S.R. . |
| A 1 666 479 | 7/1991 | U.S.S.R. . |
| A 126 397 | 5/1919 | United Kingdom . |
| A 443 831 | 3/1936 | United Kingdom . |

OTHER PUBLICATIONS

International Polymer Science and Technology, vol. 7, No. 6, 1980, Shawbury, Shrewsburey, Great Britain, pp 59–61, by Okamoto H. et al. 'Mechanochemical Reclamation of Comminuted Tyre Srap Using Vulcanisation Accelerator', p. 59, par. 1.1—p. 60, table 2, p. 61, par. 3.2.

*Primary Examiner*—David A. Simmons
*Assistant Examiner*—Kenneth M. Jones
*Attorney, Agent, or Firm*—Pennie & Edmonds LLP

[57] ABSTRACT

A process for reclaiming elastomeric material from elemental sulphur-cured elastomeric material having a vulcanized network without using hexamethylene tetramine, by treating the sulphur-cured elastomeric material having a vulcanized network with one or more rubber delinking accelerators selected from the group of zinc salts of thiocarbamates and zinc salts of dialkyl dithiophosphates, 2-mercaptobenzothiazole or derivatives thereof, thiurams, guanidines, 4,4'-dithiomorpholine and sulphenamides, and a zinc oxide activator in an amount sufficient to act as an activator for the accelerator(s) to delink the elastomeric material at a temperature below 70° C., whereby the vulcanized network is opened up or delinked to provide a curable reclaimed elastomeric material capable of being vulcanized without adding rubber vulcanizing chemicals. The invention also includes compositions capable of delinking the vulcanized network of sulphur-cured elastomeric materials including the accelerators and activator described above. The obtained recycled, or reclaimed, elastomeric material has desired physical and dynamic characteristics that render it suitable for use in molded goods or for admixture with fresh compounds in tires and related products.

13 Claims, No Drawings

RECLAIMING OF ELASTOMERIC MATERIALS

RELATED APPLICATION

This is a continuation-in-part application of Ser. No. 08/326,411 filed Oct. 20, 1994 now abandoned.

FIELD OF INVENTION

This invention concerns the reclaiming of elastomeric products such as tires, mouldings, gloves and beltings made from natural rubber or synthetic rubber or blends thereof which were originally vulcanised by the conventional sulphur-accelerated vulcanising systems so that the reclaimed elastomeric material may be recycled.

PRIOR ART

Recycling of reclaimed rubber from used rubber products is well-known in the industry where some 200,000 tonnes of recycled rubber is involved per annum. The conventional rubber recycling processes use high temperature and catalysts to digest the elastomeric material being recycled resulting in a high consumption of energy and appreciable degradation of the elastomeric material being reclaimed. Thus, such reclaimed rubber has uses which are restricted by its poor physical properties. A typical reclaimed rubber has tensile strength not more than 5 to 6 MPa while raw natural rubber with the same compound can provide strengths of over 20 MPa. The conventional process is also labour intensive and is difficult and complicated with respect to quality management and standardisation.

The conventional rubber processes in essence consists of taking vulcanised rubber crumbs, admixing them with catalysts and subjecting the admixture to temperatures of more than 170° C. for periods of more than 4 to 6 hours in a digestor. The resulting material is then subjected to mastication until it is rendered into sheet form. Such rubber products are used in small proportions as processing aids or diluents with fresh rubber compounds. The presence of recycled rubber in the mixture will adversely affect the physical and dynamic properties of the final vulcanisate.

Used tires and other rubber articles are becoming an environmental hazard globally. There is a distinct demand for a satisfactory recycling process to address this ever increasing environmental problem. The used tire mountains now in existence globally are a fire hazard. Many attempts and approaches have been made to assuage this environmental issue. Among these could be mentioned the use of pelletized tire crumbs for road surfacing, the burning of such crumbs to generate energy and so on.

Czechoslovakian patent specification no. 110,439 is concerned with methods of increasing bond strength between rubber and textile material which does use a phenol such as resorcinol and hexamethylenetetramine. However, these are the agents for providing the increase in bond strength and do not according to the disclosure of the specification have any significant effect in cutting cross-links in vulcanised rubber.

Thus, none of the conventional methods or approaches have succeeded in making any real progress in solving this vexing global problem.

SUMMARY OF THE INVENTION

There is, therefore, required a method of effectively recycling used rubber products entailing a cost effective process which will open up or delink the crosslinks of the vulcanized network structure in used rubber crumbs without unduly degrading the backbone polymer. The more successful reclaimed rubber maintains the original physical and dynamic characteristics of original natural and synthetic rubbers, the wider the applicability of such reclaimed rubbers in further rubber manufacturing process.

DETAILED DESCRIPTION OF THE INVENTION

We have now developed a process which essentially converts used rubber product, preferably in the form of crumbs into a elastomeric material having properties which approach that of fresh elastomers in similar compounds. This process is elegant, simple and is neither energy nor labour-intensive.

We have reinvestigated the Czechoslovakian process and have now developed an entirely new system to effect the proton transfer reaction which is believed to be essential. Our process, however, does not use hexamine which is a hazardous chemical to handle. Instead, we have relied on chemicals already used in the conventional rubber manufacturing process.

Our discovery essentially comprises of the use of a novel chemical mixture which is capable of initiating proton exchange in a controlled manner at temperatures below 70° C., preferably below 50° C., i.e. by opening up or delinking the vulcanised network of elastomer material.

Accordingly, the present invention provides a process for reclaiming elastomeric material from elemental sulphur-cured elastomeric material, which process comprises treating the said sulphur-cured elastomeric materials with one or more compounds which are capable of performing the rubber accelerator function and one or more activators capable of initiating proton exchange at temperatures below 70° C. and thereby open up or delink the vulcanised network of the sulphur-cured elastomeric material to provide sulphur-curable reclaimed elastomeric material.

The invention also includes the delinking compositions which are described herein.

Our novel chemical composition (hereinafter "Delink") comprises one or more chemical compounds which are capable of performing the rubber accelerator function and one or more activators. The compounds, which are used conventionally as rubber accelerators, when used co-jointly with one or more activators capable of initiating proton exchange at temperatures below 70° C. has to be capable of opening up or delinking the vulcanised network of the sulphur-cured elastomeric material to provide sulphur-curable reclaimed elastomeric material.

Preferably, the compounds which may perform the function of rubber accelerator comprise zinc salt of thiocarbamates such as zinc dimethyldithiocarbamate (hereinafter "ZDMC") and 2-mercaptobenzothiazole (hereinfater "MBT"), or derivatives thereof, in the molar ratio in the range of 1:1 to 1:12. The accelerators are activated by one or more activators, preferably stearic acid and zinc oxid. Sulphur may be additionally added to the mixture.

ZDMC and MBT being mentioned above as preferred accelerators may be replaced with other accelerators some of which may be less active. The following, which are no means exhaustive, are examples of known accelerators which may replace ZDMC and MBT.

ZDMC may be replaced on a molecular basis by other zinc salts of dithiocarbamates such as zinc dimethyldithiocarbamate zinc diethyldithiocarbamate (ZDEC), zinc dipropyldithiocarbamate, zinc dibutylthiocarbamate (ZBDC) or zinc dibenzyldithiocarbamate (ZBEC), or by zinc dialkyl dithiophosphates such as zinc dibutyldithiophosphate, and other chemicals which may perform the function of rubber accelerator.

Similarly, MBT may be replaced on a molecular basis by other thiazole accelerators such as benzothiazyl disulphide (MBTS), or zinc 2-mercaptobenzothiazole (ZMBT), or by suphenamide accelerators such as N-cyclhexyl-2-benzothiazole sulphenamide (CBS) or N-tert-butyl 2-benzothiazole sulphenamide (TBBS), or by by thiuram accelerators such as tetraethylthiuram disulphide (IFID), tetramethylthiuram disulphide (TMTD) or tetrabenzylthiuram disulphide (TBETD), or by nitrogen-based accelerators such as guanidines, N,N'-diphenylguanidine, d-orthotolylguanidine, and 4,4'-dithiomorpholine, or any other chemicals which may perform the function of rubber accelerator.

The combination of MBT or derivatives of MBT or other accelerators and ZDMC or derivatives of ZDMC in the molecular proportion initiates the proton exchange reaction which is assisted by the presence of stearic acid and zinc oxide. The presence of a small amount of sulphur was found to aid ultimate vulcanisation but is not necessary. Similarly, the presence of diol may help in the dispersion of the powders and perhaps activates the mixture but this is not essential.

This novel chemical mixture, or Delink (the delinking composition hereof), when blended with tire crumbs or any other vulcanised elastomeric crumbs in concentrations of preferably 6 parts Delink per 100 parts of rubber crumbs on a mill, effectively delinks the vulcanised network and renders the resulting sulphur-curable reclaimed elastomer ready for moulding and vulcanization. The total milling period, which occurs preferably at temperatures below 70° C., takes only 7 to 10 minutes. Alternatively, the Delink and tire crumbs could be first mixed in an intermix and subsequently milled in an open mill.

We have also developed a more convenient method of handling the delinking composition (Delink), i.e. by the masterbatch method. The Delink is first mixed with fresh or vulcanised rubber, the ratios of Delink to rubber varying between 90:10 to 40:60. This masterbatch mixture can be mixed with vulcanised crumbs in proportions which will ensure that the ultimate ratio of Delink:rubber is 6:100. Parts are parts by weight.

Some embodiments of the invention will now be described, by way of illustration, with reference to the following Examples and Tables, and the properties of the ensuing compounds illustrate the manner in which this invention is effective in practice.

EXAMPLE 1

The following materials are mixed in the given proportions:-

| | |
|---|---|
| 1. 2-mercaptobenzothiazol (MBT) | 20.0 |
| 2. Zinc dimethyldithiocarbamate (ZDMC) | 6.0 |
| 3. Stearic acid | 2.0 |
| 4. Zinc oxide | 2.0 |
| 5. Sulphur | 1.5 |
| 6. Diethylene glycol | 12.0 |
| | 43.5 |

The powders are first intimately mixed with vigorous stirring and then the diethylene glycol added to render the whole Delink composition into a smooth paste.

500 g of tire crumbs are milled in a 2 roll mill for 3 minutes and then 15 g of the Delink added. After further milling for 2 minutes another 15 g of the Delink is introduced. The final 2 minutes of milling are carried out at narrow nip. By this time, it is possible to sheet out the compound which is ready for vulcanization at 150° C. for 15 to 30 minutes. Properties of the vulcanisates using tire crumbs originating from Malaysia and Europe are shown in Table 1 below.

TABLE 1

CHARACTERISTICS OF VULCANISATES
prepared from tyre crumbs of 100% natural rubber

| | Country of origin | Malaysia | | Europe | |
|---|---|---|---|---|---|
| No. | Characteristics | 1 | 2 | 3 | 4 |
| 1. | Size (mm) | 0.1–0.5 | 0.1–0.5 | 0.1–0.5 | >1.0 |
| 2. | Delink content (parts per hundred of crumb) | 6 | 6 | 6 | 6 |
| 3. | Vulcanisation (°C.) | 143 | 155 | 143 | 143 |
| 4. | Mooney viscosity, $M_t^{100}$ | 68 | 68 | 75 | 120 |
| 5. | Stress at 100% elongation (MPa) | 3 | 3 | 3.5 | 5.5 |
| 6. | Tensile strength (MPa) | 12.1 | 12.7 | 14.5 | 16 |
| 7. | Elongation at break (%) | 350 | 350 | 375 | 400 |
| 8. | Elongation set (%) | 15 | 15 | 15 | 12 |
| 9. | Relative concentration of chains, $V_{rel} \times 10^4$ (mole/cm$^3$)* | 1.1 1.1 | 1.2 1.2 | 1.2 1.2 | 1.3 1.3 |
| 10. | High elastic component of creep, $A \times 10^3$ (MPa) ($\sigma_o = 0.8$ MPa)** | 0.5 | 0.5 | 0.4 | 0.4 |

*$V_{rel}$ was calculated from the Mooney-Rivlin equation:
$$V_{rel} = \frac{E}{RT(\lambda - 1/\lambda^2)}$$
where E is strain:
$\lambda$ is the degree of elongation;
R is the gas constant; and
T is temperature
**Creep was calculated as follows:
$D(\sigma,T) = D_o(\sigma,T) + A(\sigma,T)\log_\tau + \tau/\eta(\sigma, T)$
where D is strain (%), $D_o$ is the initial strain at $\tau = 1$ min (%);
A is the rate constant of creep of high elastic strain (1/MPa);
$\eta$ is viscosity (Pa · s)

EXAMPLE 2

The Delink described in Example 1 in this case is incorporated into tire crumbs and pelletised used gloves, again in the proportion of Delink:vulcanised crumbs at 6:100. The masticatication and Delink incorporation process are as described in Example 1. The mill temperature is not allowed to exceed 70° C. The total milling time is kept below 10 minutes. Table 2 below shows the properties obtained from tire and glove crumbs. For comparison purposes the general properties obtained from fresh rubber both with (tire compounds) and without fillers (pure gum compound) are shown in Table 2 below.

TABLE 2

Properties obtained from scrap tyre treads and scrap gloves in comparison with compounds using fresh rubber

| Material type | tyre scrap | scrap glove | fresh rubber (tyre compounds) | fresh rubber (gum compounds) |
|---|---|---|---|---|
| Tensile strength (MPa) | 13 | 14.5 | 18–21 | 21–23 |
| Elongation (%) | 300 | 900 | 350–500 | 700–800 |
| Elongation set (%) | 10 | 15 | — | — |
| Relative concentration of chains, $V_{rel} \times 10^3$ (mole/cm$^3$) | 1.4 | 0.6 | — | — |

EXAMPLE 3

In this Example, the Delink (as described in Example 1) is admixed with fresh rubber, tire crumbs and glove crumbs to obtain master batches containing 90% Delink and 50% Delink. The masterbatches so produced are then incorporated separately into tire crumbs and glove crumbs in the manner described under Example 1, except that, in the case of the 90% Delink masterbatch, 6.6 parts of the master batch is used for 100 parts of vulcanised crumbs and for the 50% master batch, 12 parts per 100 of crumbs are employed. The resultant properties are shown in Table 3.

TABLE 3

Properties obtained using Delink masterbatches

| Type of | fresh NR: Delink 10:90 | | NR:Delink 50:50 | | Gloves:Delink 10:90 | | Gloves:Delink 50:50 | |
|---|---|---|---|---|---|---|---|---|
| masterbatch Vulcanised scrap: | tyre tread | gloves | tyre tread | gloves | tyre tread | gloves | tyre tread | gloves |
| Tensile strength (MPa) | 11.5 | 17 | 11 | 10 | 10 | 13.5 | 12 | 10.5 |
| Elongation (%) | 250 | 860 | 250 | 610 | 250 | 780 | 320 | 600 |
| Elongation set (%) | 5 | 10 | 6 | 15 | 10 | 10 | 6 | 15 |
| Relative concentration of chain, $V_{rel} \times 10^4$ (mole/cm$^3$) | 1.3 | 0.7 | 1.3 | 0.6 | 1.2 | 0.6 | 1.3 | 0.6 |

The above examples are illustrative of the versatility and effectiveness of the process of the present invention to provide recycled rubber compounds from used natural rubber, synthetic rubber vulcanisates and combinations of natural and synthetic rubber vulcanisates.

The resultant reclaimed rubber compounds display satisfactory level of physical and dynamic characteristics. Such compounds can be directly used in moulded goods or in admixture with fresh compounds. Examples of such goods which have been made using reclaimed elastomer in conventional methods of moulding and vulcanisation are tires, mats, carpet underlays, electrical insulation layers, industrial tires, tubings and retreads.

The masterbatching process can be further refined with use of stirene butadiene rubber in place of natural rubber. With careful control of the Delink incorporation process, the milling process and temperature during mastication, the resultant physical and dynamic characteristics of the final reclaimed compound from tire and glove wastes can be further enhanced.

The following examples illustrate some cases where MBT is replaced with other accelerators.

EXAMPLE 4

The following materials are mixed in the given proportions:

| | |
|---|---|
| 1. Benzothiazyl disulphide (MBTS) | 27.8 |
| 2. Zinc diethyldithiocarbamate (ZDEC) | 7.6 |
| 3. Stearic acid | 5.1 |
| 4. Zinc oxide | 2.5 |

Then 10 parts of this Delink mix are added to 100 parts of tire crumbs and 12.5 parts of raw natural rubber as described in Example 1. The relevant physical properties of the mix are shown in Table 4 below.

TABLE 4

Properties of MBTS mix using raw natural rubber

| | |
|---|---|
| tensile strength (MPa) | 10.0 |
| Elongation at break (5) | 336 |
| Modulus at 300% elongation (MPa) | 5.6 |

EXAMPLE 5

The following materials are mixed in the given proportions:

| | |
|---|---|
| 1. N-cylohexyl-2-benzothiazole sulphenamide (CBS) | 43.9 |
| 2. Zinc diethyldithiocarbamate (ZDEC) | 7.6 |
| 3. Stearic acid | 5.1 |
| 4. Zinc oxide | 2.5 |

Then 10 parts of this Delink mix are added to 100 parts of tire crumbs and 12.5 parts of raw natural rubber as described in Example 1. Some relevant physical properties of the mix are shown in Table 5.

TABLE 5

Properties of CBS mix using raw natural rubber

| | |
|---|---|
| Tensile strength (MPa) | 11.1 |
| Elongation at break (%) | 369 |
| Modulus at 300% elongation (MPa) | 7.9 |

EXAMPLE 6

The following materials are mixed in the given proportions:

| | |
|---|---|
| 1. N-tert-butyl-2-benzothiazole sulphenamide (TBBS) | 39.8 |
| 2. Zinc diethyldithiocarbamate (ZDEC) | 7.6 |
| 3. Stearic acid | 5.1 |
| 4. Zinc oxide | 2.5 |

Then 10 parts of this Delink mix are added to 10 parts of tire crumbs and 12.5 parts of raw natural rubber as described in Example 1. Some relevant physical properties of the mix are shown in Table 6.

TABLE 6

Properties of TBBS mix using raw natural rubber and tyre crumbs

| | |
|---|---|
| Tensile strength (MPa) | 12.0 |
| Elongation at break (%) | 353 |
| Modulus at 300% elongation (MPa) | 9.3 |

The invention being thus described, it will be obvious that the specific procedures described herein may be varied in many ways. Such variations are not to be regarded as a departure from the scope of the invention.

There are described above novel features which the skilled person in the art will appreciate give rise to advantages. It is to be noted that in addition to or as an alternative to the use of stearic acid there may be used methacrylic acid. Also in place of diethylene glycol, there may be used propylene glycol, dipropylene glycol or triethylene glycol as well as other suitable diols which can be identified by simple experimentation.

Apart from the compounds which are capable of performing the rubber accelerator function as described above, it should be understood by the person skilled in the art that the said compounds which fall within the scope of this invention include compounds conventionally used and compounds that may be used as rubber accelerators.

These are each independent aspects of the present invention. For example, the ingredients of the "paste" of Example 1 may be varied by plus or minus 20%, preferably by plus or minus 10%. Accordingly, the delinking composition may comprise the (a) ingredient such as ZDMC in the range of 4.8 to 7.2 parts by weight and the (b) ingredient such as MBT in the range of 16 to 24 parts by weight. Preferably, there is also present in the delinking composition stearic acid an zinc oxide both in the range 1.6 to 2.4 parts by weight. Further, sulphur may be present in the range 1.2 to 1.8 by weight and a diol such as diethylene glycol may be present in the range 9.6 to 14.4 parts by weight.

It is to be noted that the invention also includes the composition as described above and these may being the form of pastes or masterbatches.

We claim:

1. A process for obtaining curable elastomeric material from elemental sulphur-cured elastomeric material having a vulcanized network without using hexamethylene tetramine, which process comprises:

treating the sulphur-cured elastomeric material with an admixture comprising one or more class (A) rubber delinking accelerators selected from the group consisting of zinc salts of thiocarbamates and zinc salts of dialkyl dithiophosphates; together with one or more class (B) rubber delinking accelerators selected from the group consisting of 2-mercaptobenzothiazole or derivatives thereof, thiurams, guanidines, 4, 4'-dithiomorpholine and sulphenamides and providing zinc oxide to form a mixture containing sulphur-cured elastomeric material having a vulcanized network, the zinc oxide being present in an amount sufficient to act as an activator for the accelerator(s) to delink the elastomeric material at a temperature below 70° C.; and delinking the vulcanised network of the elastomeric material in the mixture to provide a curable reclaimed elastomeric material capable of being vulcanised without further adding rubber vulcanising chemicals.

2. A process according to claim 1, wherein:

(a) the zinc salt of thiocarbamate is zinc dimethyldithiocarbamate, zinc diethyldithiocarbamate, zinc dipropyldithiocarbamate, zinc dibutylidithiocarbamate or zinc dibenzyldithiocarbamate;

(b) the zinc dialkyl dithiophosphate is zinc dibutyl dithiophosphate.

(c) the 2-mercaptobenzothiazole or derivative thereof is zinc mercaptobenzothiazole or benzothiazyl disulphide;

(d) the sulphenamide is N-cyclohexyl-2-benzothiazolesulphenamide or N-tertbutyl-2-benzothiazole sulphenamide; and (e) the thiuram is tetraethylthiuram disulphide, tetramethylthiuram disulphide or tetrabenzylthiuram disulphide.

3. A process according to claim 1 wherein the class (A) accelerator is selected from the group consisting of zinc dimethyldithiocarbamate, zinc diethyldithiocarbamate, zinc dipropyldithiocarbamate, zinc dibutylidithiocarbamate or zinc dibenzyldithiocarbamate; and the class (B) accelerator is selected from the group consisting of 2-mercaptobenzothiazole, zinc mercaptobenzothiazole or benzothiazyl disulphide.

4. A process according to claim 3 wherein the two accelerators (A to B) are in the respective molar proportion within the range of 1:1 to 1:12.

5. A process according to claim 1, wherein the activator component is zinc oxide used in combination with a fatty acid co-activator.

6. A process according to claim 5, wherein the fatty acid co-activator is stearic acid.

7. A process according to claim 1, wherein a masterbatch comprising a mixture of the rubber delinking accelerators and activator and an elastomeric material is used with the ratio of accelerators plus activator to elastomeric material being in the range of 40:60 to 90:10 on a weight basis.

8. A process according to claim 1, wherein the accelerator plus activator mixture is mixed with the elastomeric material in a ratio of about 6 parts of the mixture per 100 parts of the elastomeric material, on a weight basis.

9. A process according to claim 8, wherein the masterbatch is used and the proportion of the masterbatch to elastomeric material is adjusted accordingly to achieve the ratio of mixture to elastomeric materials of 6:100, on a weight basis.

10. A process according to claim 1, wherein the sulphur-cured elastomeric material is used material and wherein the elastomeric material was derived from natural rubber, synthetic rubber or blends thereof.

11. A process according to claim 1, wherein the sulphur-cured elastomer material is in the form of crumbs.

12. A process for producing an article from reclaimed elastomeric material as produced by the process as claimed in claim 1, wherein the reclaimed elastomeric material is processed to form an elastomeric product by fabrication, moulding and/or vulcanisation, said article being one or more tires, car mats, carpet underlays, electrical insulation parts or layers, industrial tires, tubings or retreads.

13. A process for obtaining curable elastomeric material from elemental sulphur-cured elastomeric material having a vulcanized network without using hexamethylene tetramine, which process comprises:

treating the sulphur-cured elastomeric material with an admixture comprising one or more rubber delinking accelerators selected from the group consisting of zinc salts of thiocarbamates, zinc salts of dialkyl dithiophosphates, 2-mercaptobenzothiazole or derivatives thereof, thiurams, guanidines, 4,4'- dithiomorpholine and sulphenamides and providing zinc oxide to form a mixture containing sulphur-cured elastomeric material having a vulcanized network, the zinc oxide being present in an amount sufficient to act as an activator to delink the elastomeric material at a temperature below 70° C.; and delinking the vulcanised network of the elastomeric material in the mixture to provide a curable reclaimed elastomeric material capable of being vulcanised without further adding rubber vulcanising chemicals.

* * * * *